May 21, 1963
D. J. PEEPS
3,090,530
AIR FLOW CONTROL FOR PRESSURE FEED CONTAINERS
Filed June 27, 1960
2 Sheets-Sheet 1
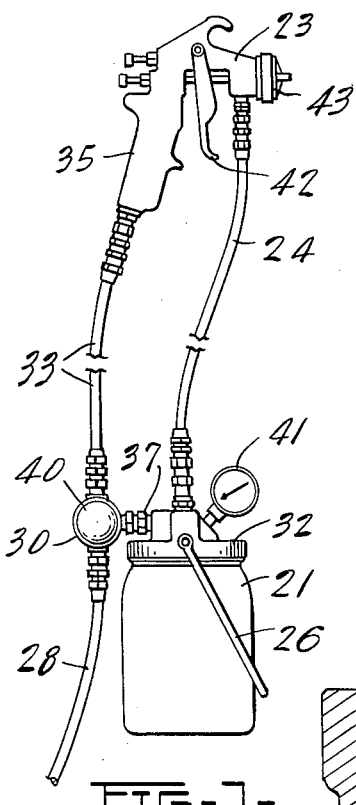
FIG-1-
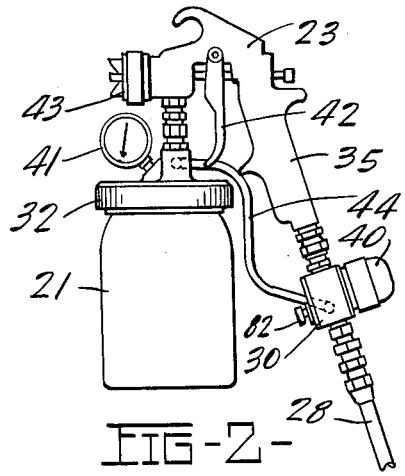
FIG-2-
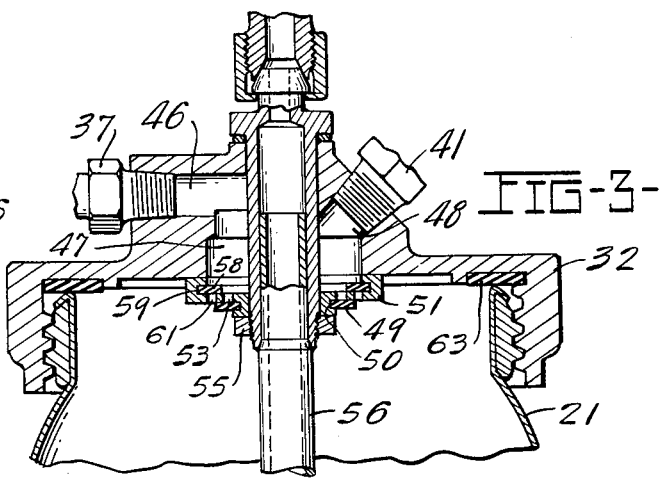
FIG-3-
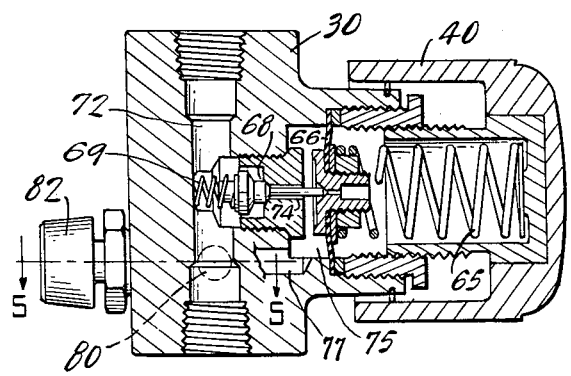
FIG-4-
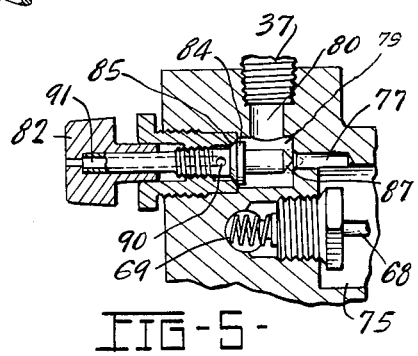
FIG-5-
INVENTOR:
DONALD J. PEEPS.
BY
W. P. Carr
ATTORNEY.

May 21, 1963   D. J. PEEPS   3,090,530
AIR FLOW CONTROL FOR PRESSURE FEED CONTAINERS
Filed June 27, 1960   2 Sheets-Sheet 2
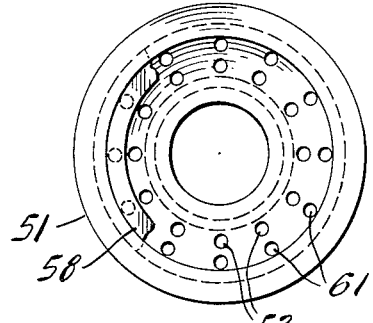
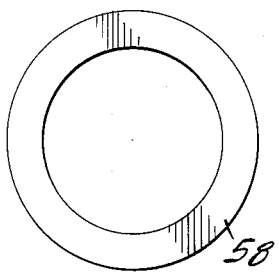
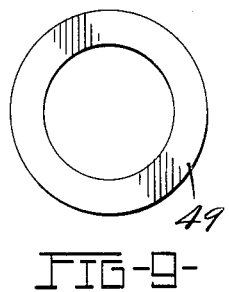
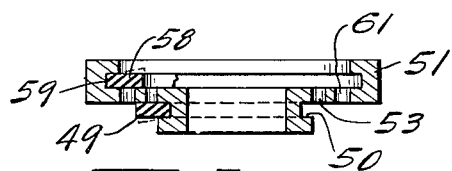
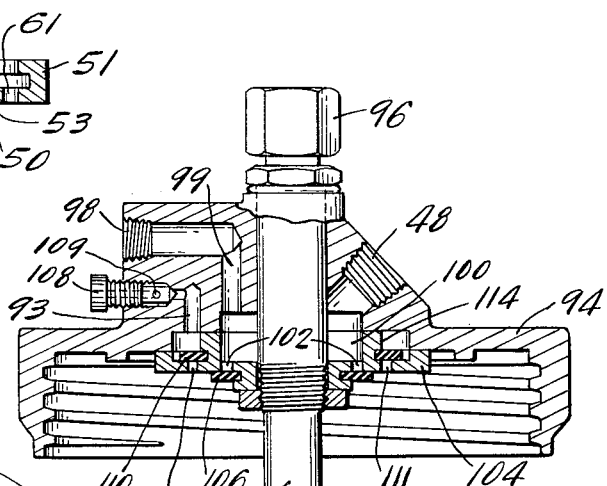
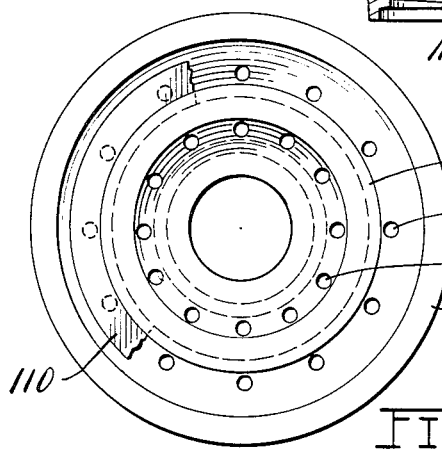
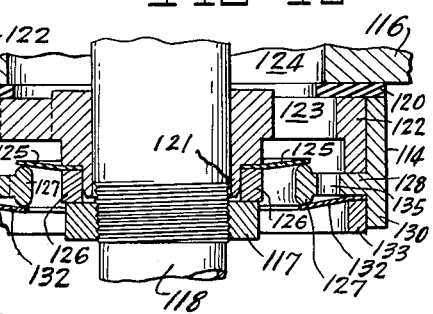
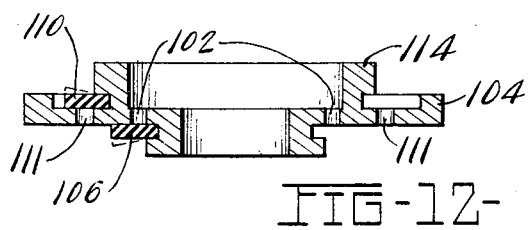
INVENTOR:
DONALD J. PEEPS.
BY
W. P. Carr
ATTORNEY.

United States Patent Office 3,090,530
Patented May 21, 1963

3,090,530
AIR FLOW CONTROL FOR PRESSURE FEED CONTAINERS
Donald J. Peeps, Rossford, Ohio, assignor to The De Vilbiss Company, Toledo, Ohio, a corporation of Ohio
Filed June 27, 1960, Ser. No. 38,853
8 Claims. (Cl. 222—400.7)

This invention relates to containers for supplying material under air pressure to spray devices, and particularly to valving mechanism for governing the entry and venting of air under presure to and from the containers.

The spray apparatus for which this invention is especially adapted is the type for applying protective and decorative finishing materials and is used generally for product finishing in industrial plants, for maintenance painting, in automobile and furniture refinishing shops, and by the home craftsman. To a lesser extent the equipment is also employed for spraying various other materials such as lubricants, insecticides, rust inhibitors and miscellaneous chemical compositions.

The spray apparatus conventionally includes a spray gun which discharges the material while atomizing it with compressed air and a container from which the material is delivered to the spray gun. Should the container be of no more than two quart capacity it is generally fastened directly to the spray gun held manually by the operator or its otherwise carried by the operator. If of larger capacity the container is connected through a supply line to the spray gun. The supply line is a flexible hose for hand work and may be fixed tubing or piping for automatic installations.

While gravity and suction may be utilized for drawing the material from the container to the spray gun, better control and faster operation is obtained by forcing the material from the container by air under pressure admitted to the container. The air delivered to the container is commonly under the control of a regulator by which the pressure may be adjusted to that giving the material flow desired.

In the connection particularly with portable equipment and when the containers are attached to the spray gun or carried by the operator with a short hose to the spray gun, considerable trouble has always been experienced from the paint or other coating material splashing into or otherwise entering the air pasages into the containers. Such contamination may clog the passages or reach and put out of commission regulators or valves associated with the container.

Many attempts have been made to alleviate this difficulty through the use of various baffles, loose packings, strainers and valves. These methods have been somewhat helpful but have not proved fully successful. The packings and strainers themselves become clogged and block the entry of air; and the baffles and valve arrangements have been either too complicated for easy cleaning or trouble-free operation, or have simply been ineffectual. The problem is augmented by the requirement of means both for admitting air to the containers to develop the pressure desired and for releasing air therefrom for reducing the pressure or evacuating the air entirely.

Accordingly, the prime object of this invention is to provide mechanism for pressure feed containers which allows air to freely enter and escape therefrom and which at the same time serves to prevent material in the container from getting into the air passages.

A further object is to provide such a structure which is of plain design, capable of long trouble-free operation, and easily cleaned.

Another object is to provide such a structure which is inexpensive to produce and adaptable for use in various types of such containers.

The mechanism through which these and other objects and advantages are attained is a dual valve arrangement of simple structure and with a carefully selected property of allowing air flow while preventing passage of the coating liquid.

The invention will be described in more detail in connection with the drawings in which:

FIGURE 1 is an elevational view of a pressure feed container of small capacity connected by flexible hose to a hand spray gun;

FIGURE 2 is a like view of a similar container attached directly to a hand spray gun and so to be supported by the operator;

FIGURE 3 is a vertical section with parts broken away of the head portion of the container of FIGURES 1 and 2;

FIGURE 4 is a vertical section of the regulator associated with the containers of FIGURES 1 and 2;

FIGURE 5 is a partial section through the regulator of FIGURE 4 taken on the line 5—5 thereof;

FIGURE 6 is an enlarged plan view of the valve assembly incorporated in the head member of the container of FIGURES 1 and 2;

FIGURE 7 shows a diametrical section of the valve assembly of FIGURE 6;

FIGURE 8 is a plan view of the relief valve of the valve assembly of the two preceding views;

FIGURE 9 is a similar showing of the inlet valve thereof;

FIGURE 10 is a vertical section with parts broken away of the head portion of a pressure feed container showing a modified from of the invention;

FIGURE 11 is an enlarged plan view of the valve assembly in the head portion of a container of FIGURE 10;

FIGURE 12 is a diametrical section of valve assembly of FIGURE 11; and

FIGURE 13 is a like section of a valve assembly of a modified design.

Referring to the drawings in more detail, in FIGURE 1 is shown a coating material supply container 21 connected to a spray gun 23 by a short flexible hose 24. The container is equipped with a bail 26 by which it may be carried in the hand of the operator which is not being used to hold and direct the spray gun; or the bail may be used to suspend the container from a shoulder sling or a hook on the operator's belt.

An air supply hose 28 is attached to the regulator 30 which is mounted on the head 32 of the container. A straight through passage in the regulator 30 delivers air for atomization to the hose 33 joined at the base of the handle 35 of the spray gun 23. The pressure of the atomizing air may be controlled at the source from which the air supply hose 28 runs, or be set by a needle valve in the straight through passage in regulator 30.

The main function of regulator 30, which conventionally is a spring-pressed diaphragm design, is to regulate the pressure of air by-passed from the straight through passage and which is directed into container 21 after going through the connection 37 and a communicating passage in the head member 32. This pressure is controlled by adjustment of regulator knob 40, and the amount of pressure is registered on gauge 41.

By manual retraction of the trigger 42 of the spray gun 23, air and material valves in the gun body are opened, and material delivered to the spray gun under pressure from container 21 through hose 24 is discharged out spray nozzle 43 and is atomized by air emitted therewith.

In FIGURE 2 the container 21 is shown in an alternate arrangement wherein it is attached directly to the spray gun 23 and receives regulated air from regulator 30 through a tubing 44. The hose 24 and the hose 33 of FIGURE 1 from the regulator 30 and from the container head 32 to the spray gun are not used with this assembly.

As shown in the section of the head 32 in FIGURE 3 the regulated air from regulator 30, whether the latter is connected directly to the head or communicates through a tubing such as 44, enters the horizontal bore 46 from connection 37 and travels down into a cylindrical chamber 47. The gauge 41 communicates with this chamber through a tapped opening 48.

The air from chamber 47 reaches the interior of container 21 to exert pressure upon the material therein by temporarily thrusting open the annular inlet valve 49. As shown also in FIGURE 7, the inner edge of this valve is held within an outwardly facing groove 50 in the valve cage member 51 while the outer free portion of the valve is resiliently held in sealing relation over an annular series of air inlet ports 53 in the member 51. The latter is secured tightly in place by the lock nut 55 threaded upon the material discharge tube 56, up through which the material flows to reach the spray gun.

An annular air relief valve 58 is held at its outer edge within an inwardly facing groove 59 in member 51 and its free inner portion normally rests resiliently upon an annular series of air outlet ports 61 through member 51.

In setting the equipment in operation the spray material is first poured into container 21 and the latter is screwed into the head 32 against the sealing gasket 63. If not previously attached, the spray gun 23 and regulator 30 are connected to the container assembly.

The adjusting knob 40 of the regulator 30 is then turned inwardly until the pressure desired in the container, which may be ten pounds per square inch, is registered by gauge 41.

A preferred internal design of the regulator is disclosed in FIGURES 4 and 5. With reference to these figures, on inward adjustment of the knob 40 the tension of spring 65 against the diaphragm 66 is increased to open valve 68 held lightly to its seat by the small spring 69. Air from the straight-through passage 72 then flows past the valve through passage 74 into the diaphragm chamber 75. From chamber 75 the air travels through bore 77 leading into chamber 79 and out a lateral passage 80 to the head connection 37 leading to the container 21.

This flow of air rapidly fills the space above the material in the container 21 and builds up a pressure sufficient to overcome the force of spring 65 and thus thrusts the diaphragm 66 away from opening contact with the valve 68. The latter then closes under the propulsion of spring 69.

By slowly turning in the knob 40, the flow of air continuously maintains the diaphragm opposing pressure to its maximum with the pressure rising simultaneously in the container, and the knob adjustment may thus be stopped at the point when the desired pressure is reached. If a greater pressure is needed further turning of the knob 40 increases the tension of spring 65 and opens valve 68 until the higher pressure acts on the diaphragm to let valve 68 again return to its seat.

Because of the swinging of the container with manipulations of the gun or by jarring of the container from movements of the operator, there will be a certain amount of splashing to cause the material to reach the underside of inlet valve 49 and of relief valve 58. Any contact from such disturbance of the material merely holds inlet valve 49 more tightly to its seat, and the carefully selected resilient material of which relief valve 58 is composed has sufficient resistance to hold the valve in closed position against the momentum thrust or weight that might be exerted against it by the material.

The composition of the relief valve must be formulated and the dimensions gauged to provide the valve with the degree of resilient strength to resist the material forces but still yield at low air pressures. The force which the valve should withstand without opening is ordinarily equivalent to two to four inches of head pressure.

Most of the well known elastomers are satisfactory as the base material for both the relief valve and the air inlet valve. A few of these elastomers are neoprene (a chloroprene polymer); Thiokol (a polysulfide polymer); copolymers of butadienes known as Hycar, Buna-S, Buna-N and butyl rubber; and chlorosulfonated polyethylene. The composition should be chosen which best stands up against the chemical effect of the particular coating materials likely to be used with the design of equipment involved. For instance, for the organic solvents of common paints Thiokol serves very effectively.

When it is time to discontinue the spraying action for refilling the container 21 with additional material or because the work has been completed, the air pressure within container 21 must be allowed to escape.

With the particular spray equipment presented this is accomplished by first turning out knob 40 to release spring 65. Then, needle valve 82 is turned inwardly to move the flange 84 away from seat 85 and to bring the needle point 87 in sealing relation against the end of bore 77. Air from the container, after pressing the relief valve 58 open, may thus travel from the head cavity 47 and head connection 37 to passage 80 in the regulator. From passage 80 the vented air moves past the flange 84, and reaches the atmosphere by entering port 90 and traveling along the hollow stem 91 of valve 82.

With the pressure released from the container 21 in this manner the container may be removed for refilling or cleaning. In preparing the equipment for the next spraying operation valve 82 is turned outwardly to move needle point 87 away from its sealing contact with bore 77 and to abut the flange 84 against seat 85.

In the modified form of the invention illustrated in FIGURE 10 there is a separate venting passage 93 leading away from the relief valve instead of having the valve communicating with the common passage of chamber 47 and bore 46 of the embodiment of FIGURE 3.

As shown in FIGURE 10 the container head member 94 has a coupling nut 96 for fastening the container assembly to the material inlet of a spray gun or to a hose for conveying the material to the spray gun.

Air for exerting pressure on the material for driving the material up the delivery tube 97 is admitted at the threaded opening 98 from regulator 30. This air travels down channel 99 into chamber 100 and hence through the ports 102 in the valve cage 104 and past the inlet valve 106.

When it is desired to release the pressure from the container, the regulator knob is first turned outwardly to curtail any further air from reaching the container and then the hollow vent valve 108 on the head 94 is opened. The air under pressure within the container then forces relief valve 110 open and the air flows through ports 111 and up through passage 93. From passage 93 the air enters the hollow stem of valve 108 through the port 109 and thus reaches the atmosphere.

The valve cage 104 is similar to cage member 51 of the head assembly shown in FIGURE 3 with the main exception that it has the upwardly extending annular ring portion 114 which contacts the underside of the head member 94 and acts as a partition between the passages above the valves 106 and 110.

Under prolonged contact with the most active organic solvents, valves composed of any of the presently available elastomers will slowly swell, and thus lose their capability of functioning properly. For this reason a modified form of the invention, as shown in FIGURE 13, has been found advantageous in connection with coating materials incorporating such highly active solvents.

In this embodiment the valves are of thin section and their position-retaining resilience is secured by clamping them with their free edges laterally deflected. The preferred composition is nylon, a linear condensation product of diabasic acids with diamines or of amino acids.

As shown in FIGURE 13, the cage assembly 114 is held against the underside of the container head member 116 by the lock nut 117, which is threaded upon the discharge tube 118. A gasket 120 seals the joint between the cage assembly and the container head member. Through the body 122 of the cage assembly are three circumferentially spaced passages 123 communicating with the common air supply and venting chamber 124.

An air pressure relieving valve 125 of flat ring form has its inner periphery clamped in place by the annulus 126 press fitted over the reduced lower end 121 of the central portion of the body 122.

The outer edge of the valve 125 is bent upwardly and rests upon the rounded top of the broadened outer portion 127 of a flange 128. The latter extends inwardly from the collar 130 which is fitted tightly over the body 122.

The air inlet valve 132, also of flat ring form, has its outer periphery clamped between the base of the flange 128 and the ring 133, which is press fitted within a skirt portion of the collar 130. Valve 132 seats against the rounded bottom of the outer portion 127 of the flange 128.

While both valves 125 and 132 are preferably of nylon composition to withstand attack by organic solvents, they may be composed of other plastics such as polyesters, polypropylenes, and tetrafluoroethylenes, or of metal alloys including stainless steels, nickel silvers and beryllium coppers.

The valves are held to their seats by their inherent resilient tendency to return to a flat state from the lateral deflection of their free peripheries. The pressure relieving valve 125 is so dimensioned and is deflected to such a degree that it has sufficient resilience to oppose opening pressure equivalent to several inches of liquid head, but not sufficient resistance to prevent quite complete venting of air under pressure from within the associated container.

Air from the container reaches valve 125 through the annular opening between the outer end of the flange 128 and the annulus 126, while air under pressure is admitted to the container by valve 132 after the air passes down a series of ports 135 in the flange 128.

In connection principally with low pressure spray equipment for home use, a spray gun and cup assembly is frequently furnished having a design in which pressure on the material is obtained by directing air to the container from the atomizing air passage in the spray gun. This air flow is in constant communication with and applies pressure to the container as long as the trigger of the spray gun is retracted and the air valve in the gun accordingly held open.

When the trigger is relinquished the stream of air to the spray gun is interrupted and the compressed air within the air passage of the gun and within the container then flows out the spray nozzle to the atmosphere. Consequently there is intermittent air movement into and from the container. The dual valve arrangement is helpful in such a design in confining the material within the container and thus preventing it from reaching air passages to and through the gun. For such a spray gun the air passages would include a chamber such as 47 above the dual valve assembly. However, the protection provided by this invention is not so essential with such equipment as no diaphragm regulator or other complicated valve mechanism to be shielded from the coating material is ordinarily involved.

The invention may also be applied to pressure feed tanks with capacities ranging from one gallon up to twenty gallons or more. When such tanks are used for portable work in painting walls, building exteriors, bridges, and other structures, they are moved about frequently and some splashing occurs. The tanks, however, are seldom tilted or knocked over in such service and the need of the dual valve protection of this invention is not as great as with the operator supported type of containers.

In production painting the tanks remain in stationary positions for the most part, and upward projection of the material against the underside of the tank covers is a fairly rare occurrence.

While the valves disclosed herein are of annular shape, arcuate or straight strip form would be quite feasible for practicing the invention.

It is believed that such substitute designs or other natural modifications may be made without departing from the invention; and the appended claims are intended to cover such variations of the particular embodiments presented herein.

I claim:

1. A container assembly for supplying material under air pressure to a spray device, of the type having a container, a head member to which the container is detachably connected, an outlet through the head member for the delivery to a spray device of material from the container, and air passage means through the head member terminating immediately above the container for the entry and venting of air to and from the top portion of the container above the level of the material; said container assembly being characterized by the combination with said air passage means of a self-acting inlet valve opening under the pressure of air to admit air to the container, a manually operated relief valve communicating with the air passage means and when in open position venting the air passage means to the atmosphere, and a supplemental self-acting relief valve in the air passage means between the manually operated relief valve and the container and of a composition and structure providing a degree of resistance to opening, when the manually operated relief valve is in open position, which permits opening of the supplemental relief valve by air under pressure within the container for venting substantially all of such air therefrom but which resists opening of said supplemental relief valve by the momentum of material splashing thereagainst or by head pressure arising from jarring or tilting of the container assembly, said self acting relief valve and self-acting inlet valve being located at the end of the air passage terminating immediately above the container and when in closed position sealing the air passage means from the container.

2. A container assembly for supplying material under air pressure to a spray device, of the type having a container, a head member to which the container is detachably connected, an outlet tube through the head member for the delivery to a spray device of material from the container, and air passage means through the head member for the entry and venting of air to and from the top portion of the container above the level of the material; said container assembly being characterized by the combination with said air passage means of a self-acting inlet valve opening under the pressure of air to admit air to the container, a manually operated relief valve communicating with the air passage means and when in open position venting the air passage means to the atmosphere, and a supplemental self-acting relief valve in the air passage means between the manually operated relief valve and the container and of a composition and structure providing a degree of resistance to opening, when the manually operated relief valve is in open position, which permits opening of the supplemental relief valve by air under pressure within the container for venting substantially all of such air therefrom but which resists opening of said supplemental relief valve by the momentum of material splashing thereagainst or by head pressure arising from jarring or tilting of the container assembly, said inlet valve and said supplemental relief valve being annular in form and coaxial with the tube extending down into the conveyor, and being located at the container end of the air passage means, whereby when said valves are in closed position the air passage means is sealed from the container.

3. A container assembly for supplying material under air pressure to a spray device, of the type having a container, a head member to which the container is detachably connected, an outlet through the head member for the delivery to a spray device of material from the container, and air passage means through the head member for the entry and venting of air to and from the top portion of the container above the level of the material; said container assembly being characterized by the combination with said air passage means of a self-acting inlet valve opening under the pressure of air to admit air to the container, a manually operated relief valve communicating with the air passage means and when in open position venting the air passage means to the atmosphere, and a supplemental self-acting relief valve in the air passage means between the manually operated relief valve and the container and of a composition and structure providing a degree of resistance to opening, when the manually operated relief valve is in open position, which permits opening of the supplemental relief valve by air under pressure within the container for venting substantially all of such air therefrom but which resists opening of said supplemental relief valve by the momentum of material splashing thereagainst or by head pressure arising from jarring or tilting of the container assembly, said air passage means including an air chamber with which the inlet valve, the manually operated relief valve and the supplemental relief valve all communicate, said inlet valve and supplemental relief valve being located at the container end of the air passage means.

the inlet valve is of annular form with one peripheral

4. A container assembly according to claim 1 in which edge held in fixed position, and with the portion extending therefrom to the opposite peripheral edge, free to flex under air pressure.

5. A container assembly according to claim 1 in which both the supplemental relief valve and the inlet valve are of flat annular form of different diameters and one of the valves is positioned coaxially within the other valve.

6. A container assembly according to claim 5 in which there is a valve cage in which both the supplemental relief valve and the inlet valve are positioned, to which the periphery of one of the valves is fixedly held and to which the inner periphery of the other valve is fixedly held.

7. A container assembly according to claim 1 in which the supplemental relief valve is of planar form with one edge held in a fixed position and is composed of an organic material permitting resilient bending of the supplemental relief valve from said edge under air pressure.

8. A container assembly according to claim 1 in which the supplemental relief valve is of planar form with one edge held in a fixed position and is composed of a metallic material permitting resilient bending of the supplemental relief valve from said edge under air pressure.

References Cited in the file of this patent

UNITED STATES PATENTS

| | | |
|---|---|---|
| 1,563,144 | Baker | Nov. 28, 1925 |
| 2,208,383 | Metrick et al. | July 16, 1940 |
| 2,317,923 | Lebo et al. | Apr. 27, 1943 |
| 2,504,009 | De Phillips et al. | Apr. 11, 1950 |
| 2,682,280 | Nicklas | June 29, 1954 |
| 2,747,594 | Boetjer | May 29, 1956 |
| 2,789,724 | Juniper | Apr. 23, 1957 |
| 2,822,961 | Seaquist | Feb. 11, 1958 |